US007299450B2

(12) United States Patent
Livshits et al.

(10) Patent No.: US 7,299,450 B2
(45) Date of Patent: Nov. 20, 2007

(54) UNDOING CHANGES IN A SOFTWARE CONFIGURATION MANAGEMENT SYSTEM

(75) Inventors: Artem Y. Livshits, Bellevue, WA (US); Christopher J. Antos, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 10/463,152

(22) Filed: Jun. 17, 2003

(65) Prior Publication Data

US 2004/0260974 A1 Dec. 23, 2004

(51) Int. Cl.
*G06F 9/44* (2006.01)
(52) U.S. Cl. ...................................... 717/121; 717/122
(58) Field of Classification Search ................ 717/120, 717/121, 122, 150; 710/100, 104
See application file for complete search history.

(56) References Cited

U.S. PATENT DOCUMENTS

| | | | |
|---|---|---|---|
| 4,507,751 A | 3/1985 | Gawlick et al. | |
| 5,278,982 A | 1/1994 | Daniels et al. | |
| 5,513,350 A * | 4/1996 | Griffin et al. | 717/106 |
| 5,557,730 A * | 9/1996 | Frid-Nielsen | 715/839 |
| 5,596,710 A | 1/1997 | Voigt | |
| 5,740,439 A * | 4/1998 | Atkinson et al. | 719/320 |
| 6,006,239 A | 12/1999 | Bhansali et al. | |
| 6,112,024 A * | 8/2000 | Almond et al. | 717/122 |
| 6,192,378 B1 | 2/2001 | Abrams et al. | |
| 6,226,792 B1 * | 5/2001 | Goiffon et al. | 717/120 |
| 6,275,976 B1 * | 8/2001 | Scandura | 717/120 |
| 6,282,698 B1 * | 8/2001 | Baker et al. | 717/118 |
| 6,298,319 B1 * | 10/2001 | Heile et al. | 703/26 |
| 6,446,255 B1 * | 9/2002 | Curtis et al. | 717/121 |
| 6,519,764 B1 * | 2/2003 | Atkinson et al. | 717/120 |
| 6,519,767 B1 * | 2/2003 | Carter et al. | 717/140 |
| 6,618,851 B1 * | 9/2003 | Zundel et al. | 717/103 |
| 6,629,316 B1 * | 9/2003 | Curtis | 717/174 |
| 6,658,656 B1 * | 12/2003 | Thompson | 717/151 |
| 6,718,535 B1 * | 4/2004 | Underwood | 717/101 |
| 6,785,882 B1 * | 8/2004 | Goiffon et al. | 717/120 |
| 6,804,682 B1 * | 10/2004 | Kemper et al. | 707/103 R |
| 6,807,548 B1 * | 10/2004 | Kemper | 707/103 R |
| 6,877,051 B2 * | 4/2005 | Iwanojko et al. | 710/100 |
| 6,938,242 B2 * | 8/2005 | Limousin et al. | 717/121 |
| 7,117,214 B2 * | 10/2006 | Wiser et al. | 707/10 |
| 7,228,326 B2 * | 6/2007 | Srinivasan et al. | 709/200 |
| 7,237,226 B2 * | 6/2007 | Simonyi | 717/110 |

OTHER PUBLICATIONS

"Web Management with Microsoft Visual SourceSafe 5.0", Steven Banick et al, Que Publishing, 1997, Whole book.*

(Continued)

*Primary Examiner*—Todd Ingberg
(74) *Attorney, Agent, or Firm*—Lee & Hayes, PLLC

(57) ABSTRACT

Carrying out maintaining a software configuration management system are disclosed. In particular, a way to reverse prior revisions without removing their history in the server are described. When a client submits an undo command to reverse the effects of one or more revisions within a stated revision range of a file, the revision history is updated by submitting a new revision that effectively removes the changes embodied within the range of undone revisions. Implementing undoing prior revisions preserves the revision history for a file, in case there is a need to access the undone revisions at a later time.

85 Claims, 7 Drawing Sheets

OTHER PUBLICATIONS

An Editor for Revision control, Christopher W. Fraser et al, ACM, 1987, pp. 277-295.*
UNDO Any Operation at Any time in group Editors, Chengxhen Sun, ACM, 2001, pp. 191-200.*
Undoing Any Operation in Collaborative graphics Editing Systems, David Chen et al, ACM, 2001, pp. 197-206.*
A Selective Undo Mechanism for Graphical User Interfaces Based on Command Objects, thomas, Berlage, ACM, 1994, pp. 269-294.*
A Framework for Undoing Actions in Collaborative Systems, Atul Prakash et al, ACM, 1994, pp. 295-330.*
Command as Media: Design and Implementation of a Command Stream, ACM, 1995, 17 pages.*
Reusable Hierarchical Command Objects, Brad A Myers et al, ACM, 1996, pp. 260-267.*
A Flexible Object Merging Framework, Jonathan P. Munson et al, ACM, 1994, pp. 231-242.*
Concepts and Implications of UNDO for Interactive Recovery, Robert F, Gordon et al, ACM, 1985, pp. 150-157.*
Recovery Protocols for Shared Memory Database Systems, Lory D. Molesky et al, ACM 1995, p. 11-22.*
Concurrency and Recovery for Index Trees, David Lomet et al, ACM , 1997, 17 pages.*

* cited by examiner

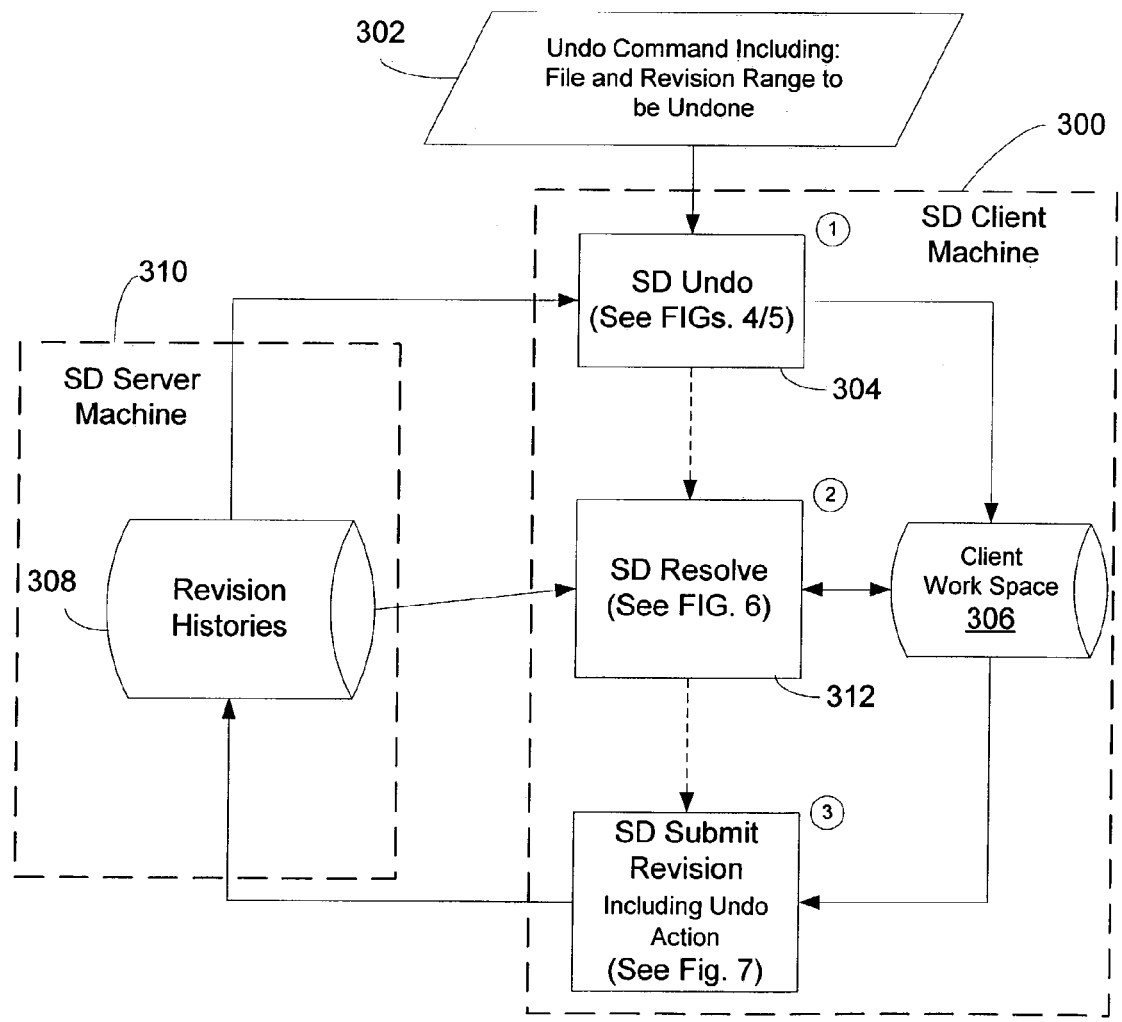

Decision Table (for selecting undo action)

| The action of the top revision of the input range | The action of the revision just before the bottom of the input range | The action of the last revision of the file | Resulting Action | Closest Reasonable Action (available when the –f flag is specified) | Resolve needed? |
|---|---|---|---|---|---|
| 'delete' | 'delete' | 'delete' | Can't open | Can't open | (N/A) |
| 'delete' | 'delete' | 'edit' or 'add' | 'edit-undo' | (N/A) | No |
| 'delete' | 'edit' or 'add' | 'delete' | 'add-undo' | (N/A) | No |
| 'delete' | 'edit' or 'add' | 'edit' or 'add' | Can't open | 'edit-undo' | Yes |
| 'edit' or 'add' | 'delete' | 'delete' | Can't open | Can't open | (N/A) |
| 'edit' or 'add' | 'delete' | The last revision is the same revision as the top of the input revision range | 'delete-undo' | (N/A) | No |
| 'edit' or 'add' | 'delete' | 'edit' or 'add' | Can't open | 'delete-undo' | No |
| 'edit' or 'add' | 'edit' or 'add' | 'delete' | Can't open | 'add-undo' | No |
| 'edit' or 'add' | 'edit' or 'add' | 'edit' or 'add' | 'edit-undo' | (N/A) | Yes |

FIG. 4

Revision Histories (example) for files "foo" and "bar"

|   | Revision | Action | Resulting Content | Integration history |
|---|----------|--------|-------------------|---------------------|
| 1 | foo.txt#1 | 'add' | line1<br>line3 | N/A |
| 2 | foo.txt#2 | 'edit' | line1<br>line2<br>line3 | N/A |
| 3 | bar.txt#1 | 'branch' | line1<br>line3 | foo.txt#1,1 |
| 4 | bar.txt#2 | 'edit' | line1<br>line3<br>line4 | N/A |
| 5 | bar.txt#3 | 'integrate' | line1<br>line2<br>line3<br>line4 | foo.txt#2,2 (inactive) |
| 6 | bar.txt#4 | 'edit' | line0<br>line1<br>line2<br>line3<br>line4 | N/A |
| 7 | bar.txt#5 | 'edit-undo' | line0<br>line1<br>line3 | N/A |

FIG. 8

UNDOING CHANGES IN A SOFTWARE CONFIGURATION MANAGEMENT SYSTEM

FIELD OF THE INVENTION

This invention generally relates to the area of computer systems. More particularly, the present invention concerns software development/productivity enhancement tools, and in particular, methods and systems for managing changes to software programs under development. Such management includes tracking and reversing changes incorporated into prior revisions (i.e., files containing changes) of program files.

BACKGROUND OF THE INVENTION

Software source code development/generation is an iterative process. From the time of conception to release of a program for distribution to the public, source code files making up the program undergo many rounds of changes. At each round, new sets of revisions (or "revised files") are submitted and stored within a software configuration management system. After storing an initial version of source code for a program, subsequent sets of revisions are submitted on top of prior revision file sets and constitute a current revision of the program's source code. Such revision file sets are tracked by software source code development tools generally referred to as software configuration management (SCM) systems. Other names given to such systems include "source control system", "version control system", and "revision control system". In SCM systems, a set of revisions for a set of files are submitted as a group to the SCM system. The SCM system then incorporates those changed files into a previous current revision of the source code to render a new current revision of the source code.

After incorporating the set of revisions to render a current revision of computer program source code, the source code is compiled to render an executable corresponding to the current revision of the program source code. Assuming compiler errors do not arise during the compiling process, (requiring yet another revision including further changes to the source code files) an executable is rendered that corresponds to the current revision of the source code files for a program. The executable is exercised in a test environment and a list of action items are rendered from testing/reviewing the operation of the executable.

Ideally, each set of changes contained in a latest revision of source code improves the operation of, or corrects a flaw within, the prior revision of the source code. However, in reality changes to earlier versions/revisions are not always desirable, and it becomes necessary to identify and undo at least some of the changes embodied within earlier revisions. Furthermore, program source code can go through multiple revisions, maintained by an SCM system, before a determination is made that earlier changes resulted in undesirable program operation.

Tracking a single set of changes between two consecutive revisions of program source code is relatively easy. However, tracking changes through multiple revisions is more complicated. In prior systems, one type of change, "undoing" one or more prior revisions by deleting the revisions (and any associated changes contained therein) from the revision history maintained by the SCM system, can be especially unnerving since such undoing of a revision removes all indications of the revision (and its particular changes) from the SCM system. If the "undoing" act is unsuccessful in remedying the flaw and the programmer seeks to return the software source code to its state before the "undoing" procedure was performed, then the programmer must re-create the revision from a source other than the SCM system.

The task of tracking and undoing changes to source code embodied in revisions is further complicated when supporting integration history (which describes changes submitted to render a revision of a source code file by specifying changes incorporated into a range of revisions to another file or files). A known SCM system, SOURCE DEPOT, as well as other SCM systems, support integration history.

SUMMARY OF THE INVENTION

The present invention comprises an SCM system and a method that, when given a range of revisions to source code to be undone (spanning potentially multiple revisions integrated from multiple files), generate and submit a new revision record including an undo action that is added to the revision history. All prior revision records are maintained in the SCM revision history for the file. Thus, undoing a set of one or more prior revisions, rather than reducing the set of revisions maintained for one or more files in the SCM system, actually adds to the revision history. The extent of the additions depends upon the revisions to be undone.

The present invention comprises a method for undoing prior revisions in a software configuration management (SCM) system that maintains a sequenced history of revisions to a set of source code files. The method includes an initial step of receiving a command to undo a set of revisions within a revision history for a file. In an embodiment of the invention, the set of revisions is specified in the form of a range of revisions for the file maintained in the SCM system's revision history.

In response, for a set/range of revisions to be undone, the SCM system determines an appropriate revision to specify when submitting a new revision incorporating the changes, to the most recent revision of the file, that effectively undo the changes embodied in the specified set/range of revisions to be undone. The new revision is thereafter submitted for incorporation into the revision history for the file.

The present invention also comprises a software configuration management (SCM) system including sub-components for facilitating undoing prior revisions in a revision history in response to receiving a command to undo a set of revisions within the revision history for a file. In particular, the SCM system includes revision determination components that, given a range of revisions to be undone in the revision history for the file, determines an appropriate new revision to the file that effectively undoes changes to the file arising from the range of revisions. A submit module submits the new revision for incorporation into the revision history for the file.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2 is an exemplary arrangement for a revision record and supported revision actions in accordance with an embodiment of the invention;

FIG. 3 is a schematic drawing depicting an SCM system arrangement including a server and client machine, and wherein the client machine carries out "undo" commands (as a series of stages) with regard to a range of revisions for a file in a revision history maintained by the server;

FIG. 4 is a decision table depicting an exemplary set of rules for selecting an undo action in response to an undo command specifying a particular range of revisions for a file;

FIG. 8 is a table depicting an exemplary set of revision records for two files (foo.txt and bar.txt) that contain software source code.

DETAILED DESCRIPTION OF THE DRAWINGS

Figure 1:
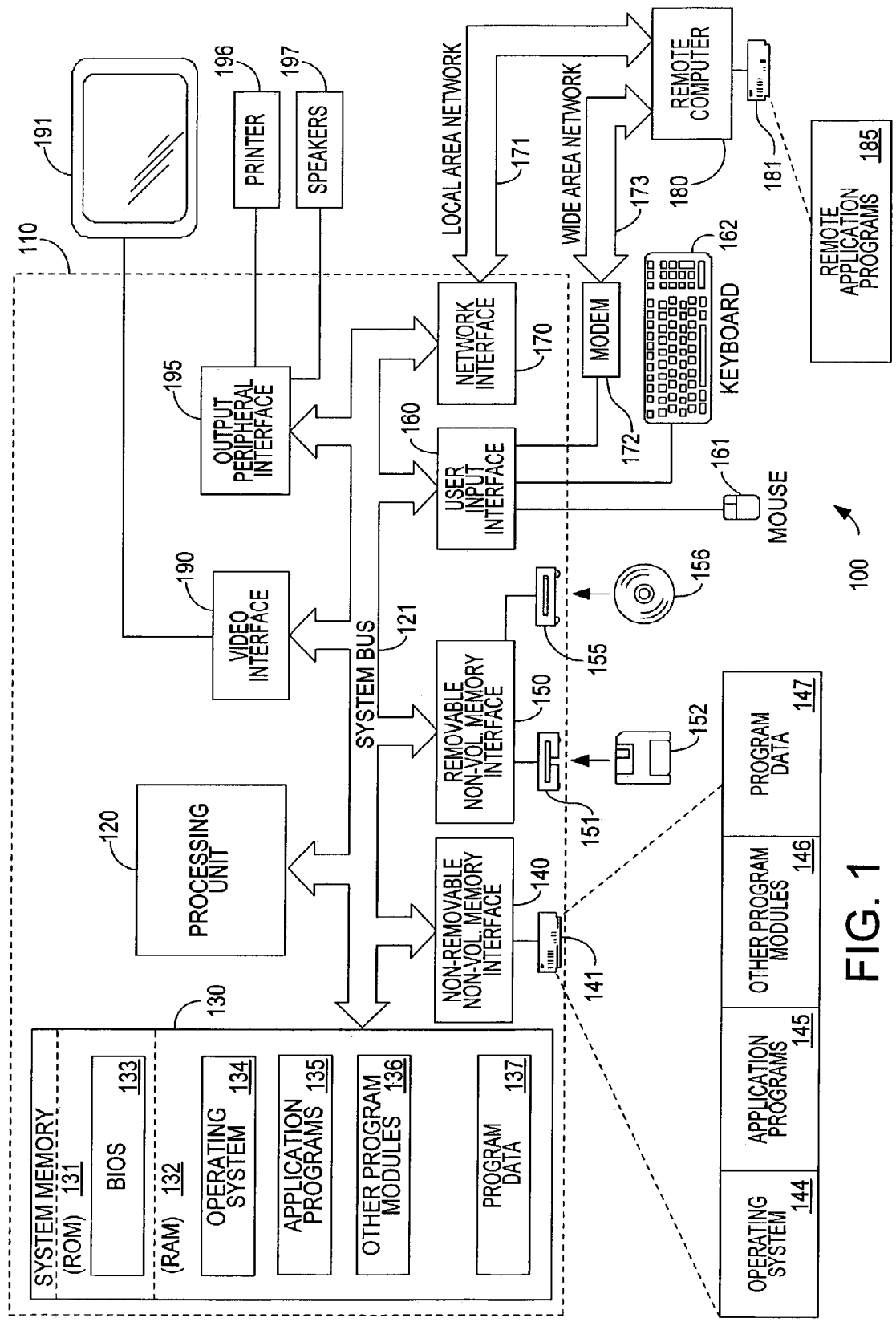
FIG. 1 is a simplified schematic illustrating an exemplary architecture of a computing device for carrying out SCM client and/or server functions in accordance with an embodiment of the present invention.

In the illustrative embodiment of the present invention, an SCM system receives and archives submitted revisions. The exemplary SCM system maintains a set of multiple revisions for identified files. Each of the set of revisions includes an action, the content of the revision, and an integration history (describing integrated revisions) if the revision comprises an integration.

The set of previously known actions on a file performed in an embodiment of the invention, by way of example, include: add (a new file), edit (an existing file), integrate (incorporates a set of changes embodied in a sequence of revisions of another file into an existing file), branch (incorporates a set of changes embodied in a sequence of revisions of another file into a new file), and delete (a file).

In accordance with an embodiment of the present invention, an SCM system supporting the above-described known set of actions is augmented to include a high-level undo command specifying a range of revisions of a file to be undone, and a set of undo actions (e.g., add-undo, edit-undo, and delete-undo) that reverse the effect of the range of revisions identified in the undo command. In the SCM system supporting the aforementioned undo actions, revisions are not removed from a file's revision history when undoing previously submitted revisions. Instead, appropriate ones of the undo actions selected in accordance with an undo action table (see, FIG. 4), effectively reversing identified ones of the previously submitted revisions, are submitted within revisions to the SCM server and become part of the revision history for the file. Thus, rather than removing revision history entries when executing undo commands, the SCM system embodying the present invention adds a revision entry implementing the undo operation. Furthermore, a prior integration action is marked "inactive" when the integration action is undone to indicate that the changes associated with the integration revision have been undone. The undo actions (and setting integration histories inactive) thus enable an SCM system to effectively reverse changes associated with identified file revisions without removing revision entries from the revision history maintained by an SCM system.

Undoing a specified range of previously submitted revisions occurs, by way of example, in three stages. Initially, the client applies an "undo" algorithm or criterion, such as the one specified, by way of example in FIG. 4, on a range of revisions to be undone with regard to a specified file, to select a proper undo action (including potentially no action) to be specified in a revision submitted to the SCM server. The client creates a pending "undo" integration record specifying a range of revisions on specified files to be undone. During a second (i.e., resolve) stage the pending "undo" integration record is processed in an upside-down order to establish a set of reversed changes. The reversed changes are applied to a current (target) revision to render a new revision. After resolving the undo integration record during the resolve stage, at a third stage of undoing previously submitted revisions, the client submits the new revision (including content if not a delete action) and potentially additional requests to modify the integration history to the server that maintains the revision history for the source code files.

The effect of submitting the revision resulting from the undo command is to reverse/undo the changes that occurred to a file over the range of file revisions specified in the undo command. Thus, when the undo command, including a range of revisions to be undone, has been resolved and submitted to the SCM system, the completed undo command produces resulting software source code content as if the given revision range was never submitted into the SCM system. However, the complete revision history (including the undone revisions and revisions submitted after the undone revisions) is preserved.

Before turning to the figures, it is noted that in an embodiment of the present invention computers implement steps described herein, for applying an undo algorithm, resolving content, and submitting a source code revision in an SCM environment, by executing software instructions, such as program modules. Generally, program modules include routines, objects, components, data structures and the like that facilitate performing particular tasks or implementing particular abstract data types. The term "program" includes one or more program modules.

FIG. 1 illustratively depicts an example of a suitable operating environment 100 for clients and an SCM server to carry out the functionality of an SCM system. The division of functionality, between the clients (from which the revision requests originate) and an SCM server that maintains an archive of revisions of one or more files, differs in various embodiments of the present invention. Furthermore, the operating environment 100 is only one example of a suitable operating environment, for the clients and/or server in an SCM system, and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Before describing an exemplary arrangement of functional components on a client and server within an SCM system, a set of commands/actions associated with an exemplary SCM system, an enhanced version of the well known Source Depot (SD) SCM System, will be described. An SD server maintains a history of file revisions. Furthermore, once added to the revision history, revisions are never removed. With reference to FIG. 2, each revision entry in the revision history includes, by way of example: a revision ID 200, an action type 202, content of the revision 204 (e.g., an entire current version of the file), and an integration history 206 (if the revision entry includes an integration action bringing an identified range of revisions into the identified file revision—described further herein below). Each of these parts of a revision history are described below.

The revision ID 200, in the revision history maintained by the SD server, identifies a particular one of many potential revisions of a file or other unit of storage maintained by the SCM system. In a particular embodiment of the invention, each revision entry in the revision history identifies, in the revision ID 200, a file and a sequence number for the particular revision of the file. Thus, a first revision of a text file (the original file) foo is named foo.txt#1. There are many ways in which to identify a file revision entry in a revision history in alternative embodiments of SCM systems embodying the present invention.

Each revision entry in the revision history includes an action applied to a preceding revision, stored in the action type 202, that resulted in the identified file revision. In the exemplary SD embodiment of the invention, previously known actions include: add, edit, delete, integrate and branch. In accordance with an embodiment of the present invention that supports an "undo" command, additional actions comprise: add-undo, edit-undo, and delete-undo. The undo prefix is added to indicate that the revision resulted from applying an undo command.

The "add" action adds a new file to the revision history. The content 204 of the revision entry for an add action specifies the content of the new file. The add action opens a new file and adds the specified content into the new file. Once an identified file is added to the revision history, a client cannot specify adding the same named file to the history until the previously added file no longer exists on the SCM system.

A file is removed by specifying the "delete" action on the file. The delete action removes the entire file from the SCM system—but not the revision history of the deleted/removed file. No content is specified for a delete action since the identified file ceases to exist in the current version of the file within the SCM system as a result of submitting the delete action.

The "edit" action indicates changes to parts (e.g., specified lines) of a previously added file. It is noted that in the exemplary embodiment of the invention, the content 204 field of the edit action entry in the revision history includes (or references the full pathname for) the entire revision of the file. However, in an alternative embodiment of the invention, the content identifies only changes made to a preceding revision to render the current revision. In any event, sufficient content is maintained for each revision to facilitate recovery of any revision of a file at any stage of the revision history for a file.

The exemplary SD SCM system supports incorporating changes present within a range of identified revisions from an identified source file into a single target file revision—this type of action is referred to herein as "integration." The source file and the range of revisions that are processed to render a set of changes applied to the target file to render the identified revision are indicated within the integration history 206. As will be explained further herein below, when a revision having an integrate or branch action specified in the action field 202 is undone, the entry in the integration history 206 field (specifying a range of revisions of a file) is marked "inactive." Marking the integration history entry inactive for a particular file revision preserves the integration history of the revision, but indicates that it is not contributing to the content of the current file revision.

One way to incorporate changes arising from a range of revisions of a source file into a newly opened target file revision is the "branch" integration action. The branch action specifies a range of revisions from a source file revision history. The changes introduced into the source file within the range of revisions are incorporated into a new ("added") target file. Therefore, the branch action can be viewed as a particular kind of "add" action that specifies its content from revision ranges taken from a source file rather than specifying source code text—as is the case with an add action. When a branch action is submitted to the SD server, the range of revisions specified in the branch action are included in the integration history 206 portion of a stored revision history entry corresponding to the specified branch action.

In contrast to the branch operation, rather than opening a new target file, the "integrate" action specifies a range of revisions from a source file revision history. The changes introduced into the source file within the range of revisions are merged into an existing target file (e.g., incorporating the changes specified in five revisions foo.txt3 through foo.txt7 into file revision bar.txt2). As will be explained further herein below, the integrated changes present in the range of revisions may conflict with earlier revisions to the target file. Such conflicts are eliminated during a resolve stage before submitting the revision and thereby making the changes permanent in the revision history maintained by the SD server of the SCM system.

The integration (branch and integrate) actions are carried out in a series of stages. As with add/edit/delete actions, an integration action initially opens a specified target revision on a user's local machine. The changes associated with the integration action are prepared and merged into the target revision on the SD client machine to render a new revision. The new revision of the target file remains on the SD client machine until a submission stage wherein the new revision is submitted to the revision history of the target file on the SD server machine (or reverted, if needed). When a temporary file is opened on the local machine, as a result of integration, a pending integration record is created that identifies a range of revisions from an integration source file (or even sets of ranges from potentially many files). The pending integration record is maintained in a temporary work space/buffer enabling the SD client to build a set of changes associated with the range of revisions from the integration source file. The pending integration record is deleted when the SD client submits or reverts the target file revision.

If an integrate action is specified, then a resolve operation is performed, by way of example, upon the SD client machine before finally submitting a set of revisions to the SD server for storage in the revision history for the file. The resolve operation handles revision conflicts/duplications while merging the specified content changes associated with a specified range of revisions. The resolve operation is not required for branch and delete actions before submission to the SD server because, in the case of an add action the content is copied over from the source file into an empty new file, and in the case of a delete action there is no content.

There are many ways in which to resolve an integrate action. In an exemplary embodiment, the resolve operation accesses information from the aforementioned "pending integration record"—namely the revision just before the bottom of the revision range and the revision at the top of the revision range and merges the set of changes that happened over the specified integration range into the opened target file. As used herein, the revision in a source file just before the bottom of the revision range is known as a "base" revision and the revision at the top of the revision range is known as a "source" revision. In an embodiment of the invention, during the resolve operation for an integration action, the SD client of the SCM system tries to apply changes from the range of revisions of the source file to the target file and prompts a user to deal with conflicts manually. Furthermore, duplication of revisions is not considered a conflict. However, because integration history is used to determine what revisions to integrate, if the specified revision range contains revisions that were previously integrated, they are excluded from the integration operation (and integration history for this particular integrate action) to decrease conflict probability.

A resolved revision is then submitted to the SD server which then adds the resolved revision to the revision history of the identified file. The integration history 206 portion of the new entry in the revision history identifies the range of revisions (file and revision numbers) that remained after completing the resolve operation. In an embodiment of the invention the integration history information is obtained from the pending integration record for the integration action (after completing the resolve operation).

Furthermore, in an embodiment of the invention, several integrate actions can be incorporated as a group into a same opened file from different files and/or different revision ranges. In such case each one of the group of integrated files/revision ranges generates a single pending integration record. The pending integration records are processed and added as a set of integration history definitions within a single revision history entry when the resulting revision is submitted to the SD server. For example, the following integration actions are resolved and submitted to an open bar.txt file:

sd integrate foo.txt#5,10 bar.txt,
sd integrate foo.txt#15,16 bar.txt, and
sd integrate baz.txt#3,3 bar.txt.

These three integrate actions create three pending integration records, and when the resolved integrate actions are submitted to the SD server, the integration history 206 portion of the single new revision entry of bar.txt is {'foo.txt#5,10', 'foo.txt#15,16', 'baz.txt#3,3'}.

Having described a set of actions, executable by an exemplary SCM system to apply changes to a revision history for source code files, attention is now directed to an enhancement to the above-described SCM system, a command (e.g., SD undo), that supports undoing a specified range of previous revisions in a revision history for a file stored within the SD server. In an embodiment of the invention such "undo" command is supported by a set of undo actions including: add-undo, edit-undo, and delete-undo. Each of these actions performs an operation on the identified file to reverse the cumulative effect of a series of prior revisions specified in the undo command. The add-undo action is an add action that resulted from an undo command, the edit-undo action is an edit action that resulted from an undo command, and the delete-undo action is a delete action that resulted from an undo command. The addition of the "undo" prefix to each of these actions informs users that the action occurred in response to an undo command. The selection of a particular one of the three "undo" actions is determined in accordance with a decision process summarized by a table depicted in FIG. 4 described herein below.

In a known SCM system, an integration operation applies changes that happen within a specified beginning and ending revision in a revision history between 2 revisions (the revision just before the bottom of the revision range and the top of the revision range). In accordance with an embodiment of the present invention, an undo revision action is performed (if possible/reasonable) based on a specified range of previously submitted revisions (from the most recent to the oldest revision in the specified range of revisions to be undone). Applying the undo action renders a new revision of the file as if the range of revisions had never occurred. However, none of the prior revision history entries are removed. Instead, whenever changes present within a range of revisions of a file need to be undone, an appropriate "undo" action (of the above-identified three undo actions) is applied to the most recent revision of the file (thereby adding to the revision history for the file). Such submitted "undo" actions are stored within new entries in the revision history maintained by the SD server for the file.

Turning now to FIG. 3, a flowchart summarizes a set of stages for carrying out an exemplary undo command in an SD SCM client-server environment. In accordance with an embodiment of the invention, a client machine 300 receives an undo command 302. Such undo command is specified, in an embodiment of the invention, in the form of "undo (<filename>,<Roldest>,<Rnewest>)" which specifies a file name, an oldest revision and a newest revision in a range of revisions to be undone. In response to receiving the undo command 302, at stage 1 of the undo procedure summarized in FIG. 3 an undo operation 304 described in detail with reference to FIG. 5 opens the identified file in the client work space 306. During stage 1 the undo operation 304 retrieves, from the revision histories 308 on the server machine 310, the relevant information for the undo revision range specified in the undo command 302. Based upon an undo action selection algorithm, summarized in a table depicted in FIG. 4 described herein below, the undo operation 304 determines the appropriate undo action to perform (if at all). After determining the appropriate undo action, a pending undo integration record is created specifying the range of revisions to be undone on the file specified in the input undo command 302. If the action is "add-undo" then content for the file is obtained from the revision histories and stored in the work space 306. In contrast to the previously described integration records, a pending undo integration record must be for the same file as the target of the undo operation in the revision histories 308.

Figure 6:
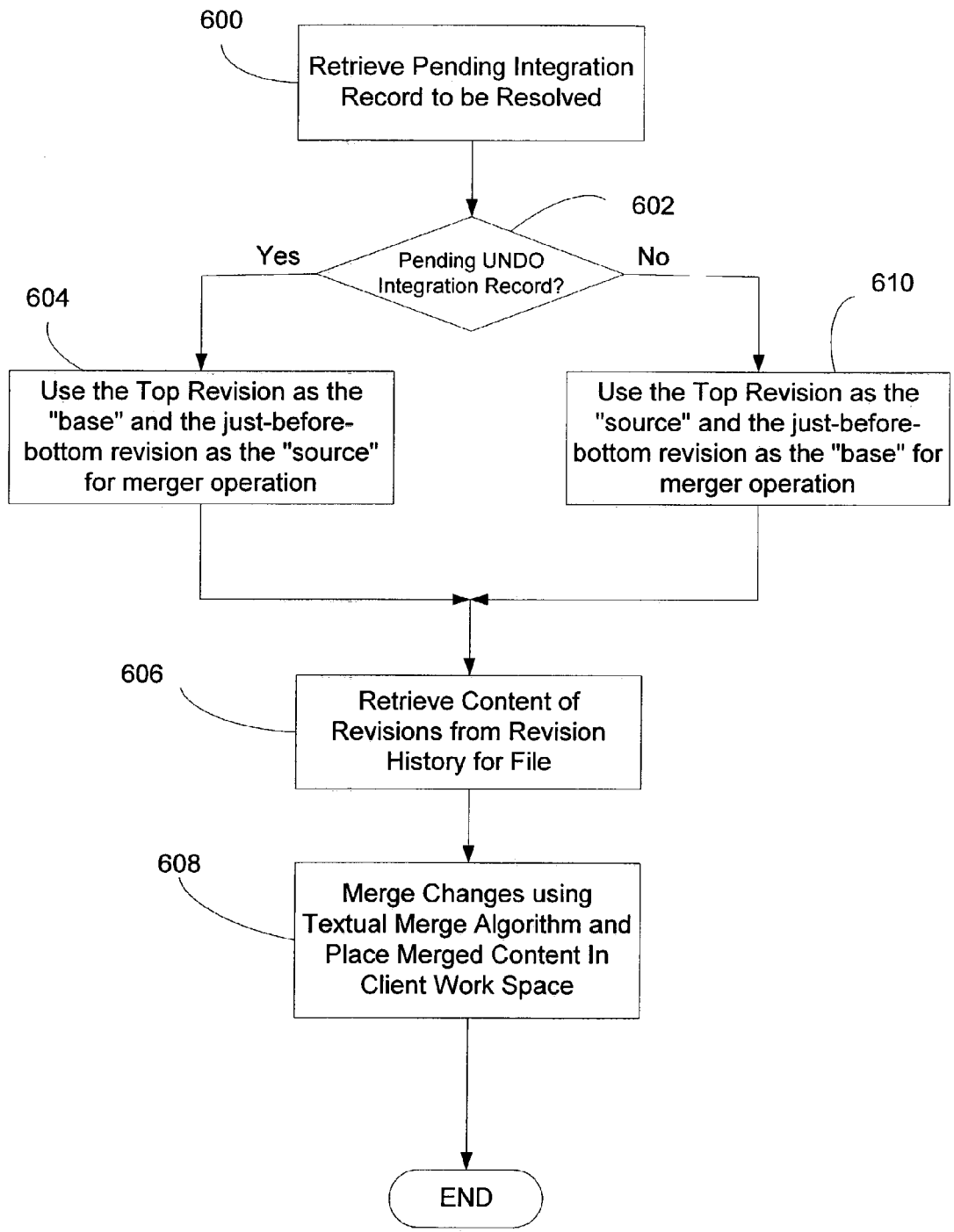
FIG. 6 is a flowchart summarizing a set of steps for carrying out a resolve operation in accordance with an embodiment of the present invention.

After creating a pending undo integration record, control passes to stage 2 of the undo command execution procedure, wherein a resolve operation 312 described in detail with reference to FIG. 6 is invoked (if needed to merge changes into a new revision) on the client machine 300. The resolve operation 312 retrieves any pending undo integration record previously placed in the client work space 306 by the undo operation 304. When the resolve operation 312 encounters a pending 'undo' integration record it applies the identified revisions in reverse (or upside-down). Therefore the revision at the top of the revision range (the most recent revision in the range) becomes the 'base' revision; and the revision just before the bottom of the revision range (the oldest revision in the range) is used as the 'source' revision during the resolve operation 312. As indicated by the arrow from the revision histories 308, the resolve operation 312 extracts the content of revisions within the range identified in a pending undo integration record. Thereafter, the resolve operation 312 generates content for a revision based upon the range of revisions identified in the pending undo integration record retrieved from the client work space 306 and retrieved content from the revision histories 308. The resolve operation 312 stores the resulting content of a revision for an associated undo action, determined by the undo operation 304, in the client work space 306.

Stage 3, identified by a submit operation 314 described in detail with reference to FIG. 7, retrieves an action, content (if not a delete action) and pending undo integration records (resolved, if necessary by the resolve operation 312) from the work space 306. The submit operation 314 provides a new revision (identifying one of the aforementioned undo actions) to the revision histories 308. Furthermore, in an embodiment of the invention, when the submit operation 314 encounters a pending 'undo' integration record for a file it marks the integration history 206 portion as 'inactive' for all revisions in the revision range for the file in the revision histories 308. Thus indicating that a previously applied integration action has been undone. After submitting the new revision containing the appropriate undo action (and marking appropriate integration histories inactive) the submit operation deletes the pending 'undo' integration record (as it does with all pending integration records) from the client work space 306. Furthermore, in an embodiment of the invention the range of revisions undone within the revision associated with the undo command is identified in an appropriate new or existing information field (e.g., action, integration history, "undo range", etc.) of the submitted revision. As mentioned above, 'inactive' integration history entries are not counted as already integrated when integration history is used to decide what revisions to integrate.

In an embodiment of the invention, an algorithm is applied to the revision history and identified range of revisions for a file to determine which, if any, action to take to undo a specified range of revisions. By way of example, the undo action selection algorithm embodied in the table depicted in FIG. 4. The chosen undo action depends on the actions of revisions to the file: just-before-the-bottom of the input revision range, the top revision of the input revision range, and on the action of the last revision of the file. These three input actions are specified in the first three columns of the table depicted in FIG. 4. When the bottom of the range is the revision #1, the action of just-before-the-bottom revision is considered to be 'delete'. Furthermore, in the input action columns (the first three) depicted in FIG. 4, an "add" action also includes branch and add-undo actions; an "edit" action includes integrate and edit-undo actions; and "delete" includes delete-undo.

The decision table depicted in FIG. 4, at the column identified as "Resulting Action" designates a proper type of undo action in view of particular other actions identified in the three input action columns. In rendering an output action, the table takes into consideration that, in some cases, merging changes doesn't make sense, e.g. when content changes are merged into deleted file. In such cases the undo operation 304, in the exemplary embodiment of the SCM system, can't open the file to generate and submit revisions to the revision histories 308. However, at indicated in the adjacent column identified as "Closest Reasonable Action," a user can coerce the SCM client's undo operation 304 to open the file anyway by specifying a "-f" flag on the undo command 302. In the case where the "-f" flag is designated and a "can't open" action is designated in the "Resulting Action" column for the input revision combination, the undo operation 304 selects an action specified in the "Closest Reasonable" column of the decision table. Finally, the last column designates whether the resolve operation 312 will need to be invoked to process the action before the submit operation stores the revision in the revision histories 308.

Figure 5:
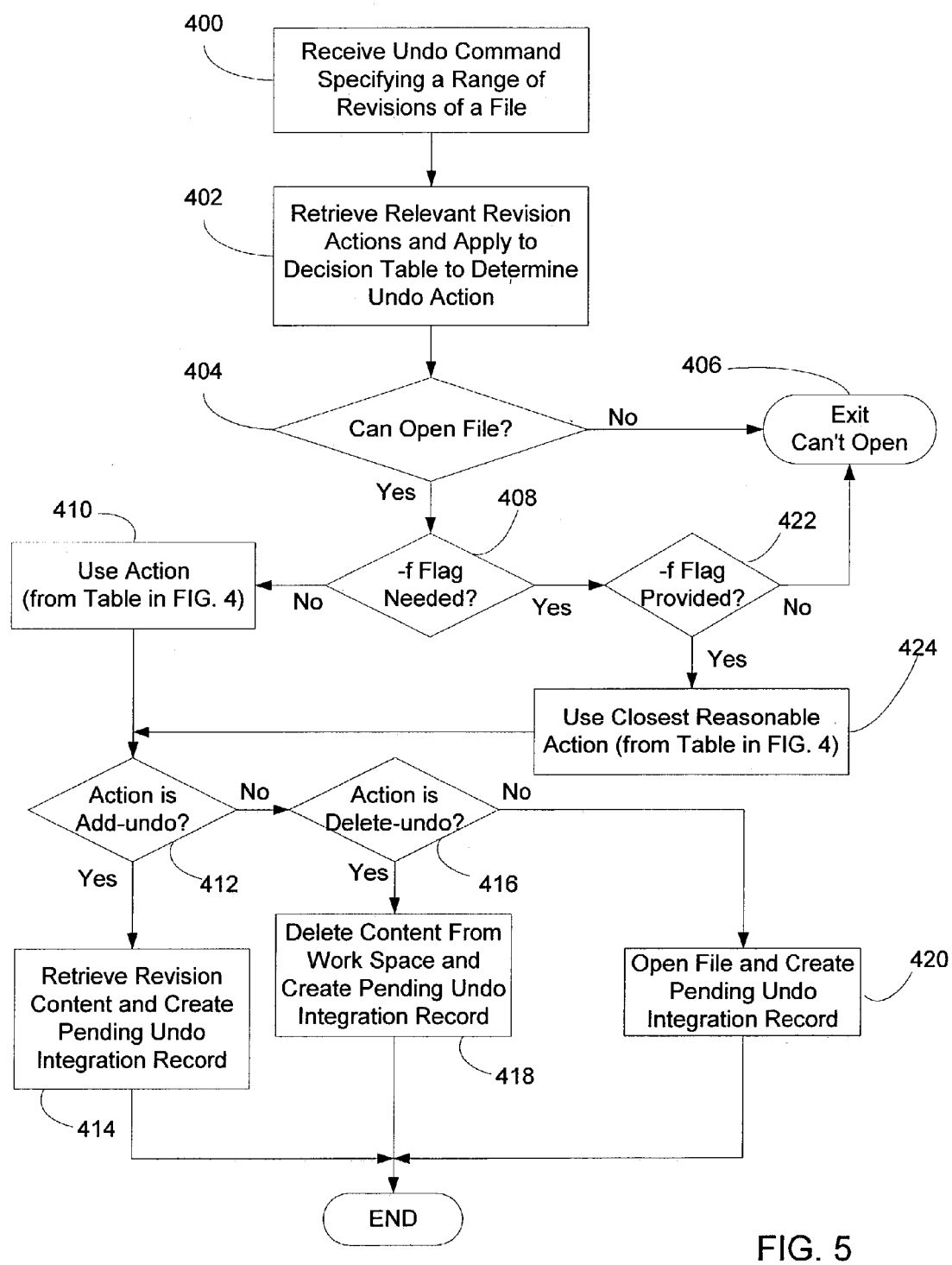
FIG. 5 is a flowchart summarizing a set of steps for carrying out an undo operation in accordance with an embodiment of the present invention.

Having described the general functionality of an SCM system embodying the present invention, attention is now directed to an exemplary set of procedures carried out within the undo operation 304, the resolve operation 312, and the submit operation 314. Turning to FIG. 5, a set of steps are summarized for the undo operation 304. Initially, during step 400 an undo command is received that specifies an input file revision range to be undone and an optional -f flag that allows a closest reasonable undo action to be submitted in the event that a undo action is really not appropriate over the provided range of revisions. Next, during step 402 the actions for the relevant revisions are retrieved from the revision histories 308, and the retrieved actions are applied to the decision table depicted in FIG. 4 to determine an undo action, if any, to be performed to render a new revision. In certain cases, the resulting action is "Can't Open".

At step 404, a determination is made whether the action determined during step 402 is "can't open" under any circumstance. If the action is "Can't Open", then control passes to step 406 and the undo operation 304 is exited without generating a revision action. However, if at step 404 the file can be opened (at least if the -f flag is specified), then control passes to decision step 408 that determines whether the -f flag is needed to render an undo action. If the -f flag is not needed (i.e., a valid resulting action is specified), then control passes to step 410 wherein the appropriate action is determined based upon the table depicted in FIG. 4. The steps that follow are intended to place a file revision in a state as close as possible (without applying the resolve operation) to the revision that will exist when the specified undue action is carried out.

Thereafter, at step 412 if the action is "add-undo", then control passes to step 414 to create a new file and fill it with content from a revision that existed just before the specified range of revisions identified in the undo command. During step 414 the new file revision is opened within the client work space 306, the content of the relevant revision (in view of the specified undo revision range) is retrieved from the revision histories 308 and placed within the new file, and a pending undo integration record is created. Control then passes to the End.

If, at step 412 the action is not an "add-undo" command, then control passes to step 416. At step 416 if the action is a "delete-undo" command, then control passes to step 418 and the client work space is cleared of previously retrieved content from the revisions, the new file revision is opened in the cleared workspace, and a pending undo integration record is created to facilitate deactivating integration histories of revisions within the input revision range. Control then passes to the End.

If at step 416 the action is not a "delete-undo" command, then the only remaining option is "edit-undo." Control passes to step 420 and the file is opened in the client work space, and a pending undo integration record is created. The content of the new file revision is established during a resolve stage that follows. Control then passes to the End.

Returning to step 408, if the -f flag is needed to designate an action (there is no actual appropriate action for the input set of actions), then control passes to step 422. If at step 422 the -f flag is indeed designated (indicating that it is desired to try to select a closest, reasonable action for an otherwise improper case for designating an action), then control passes to step 424 wherein the closest reasonable action is selected (see, FIG. 4) and control passes to step 412 wherein processing continues in view of the designated closest reasonable undo action. However, if at step 422 the -f flag is not set, then control passes to the Exit 406 (i.e., the undo command fails).

Turning to FIG. 6, a set of steps are depicted for the resolve operation 312. It is noted that this operation handles both pending undo integration records and regular pending integration records. During step 600 a pending integration record, previously added by the undo operation 304, is retrieved from the client work space. If, at step 602 the integration record is for a pending undo integration record, then control passes to step 604. At step 604, the top revision is designated as the base and the just-before-bottom revision is the source for resolving/merging revisions. Control then passes to step 606 wherein the content of the relevant revisions (e.g., base, source and target revisions) is retrieved from the revision histories 308. Thereafter, at step 608, the resolve operation 312 applies a well-known three-way textual merge algorithm to merge the content (determine the changes carried out in the revision range and apply to the target revision) and put the resulting content (of the next revision) within the client work space. On the other hand, if a regular integration record is specified at step 602, then control passes to step 610 and the top revision is the source and the revision just before the bottom revision is the base revision for purposes of applying the merge operation to the target file (the most recent revision of the file) during step 608.

Figure 7:
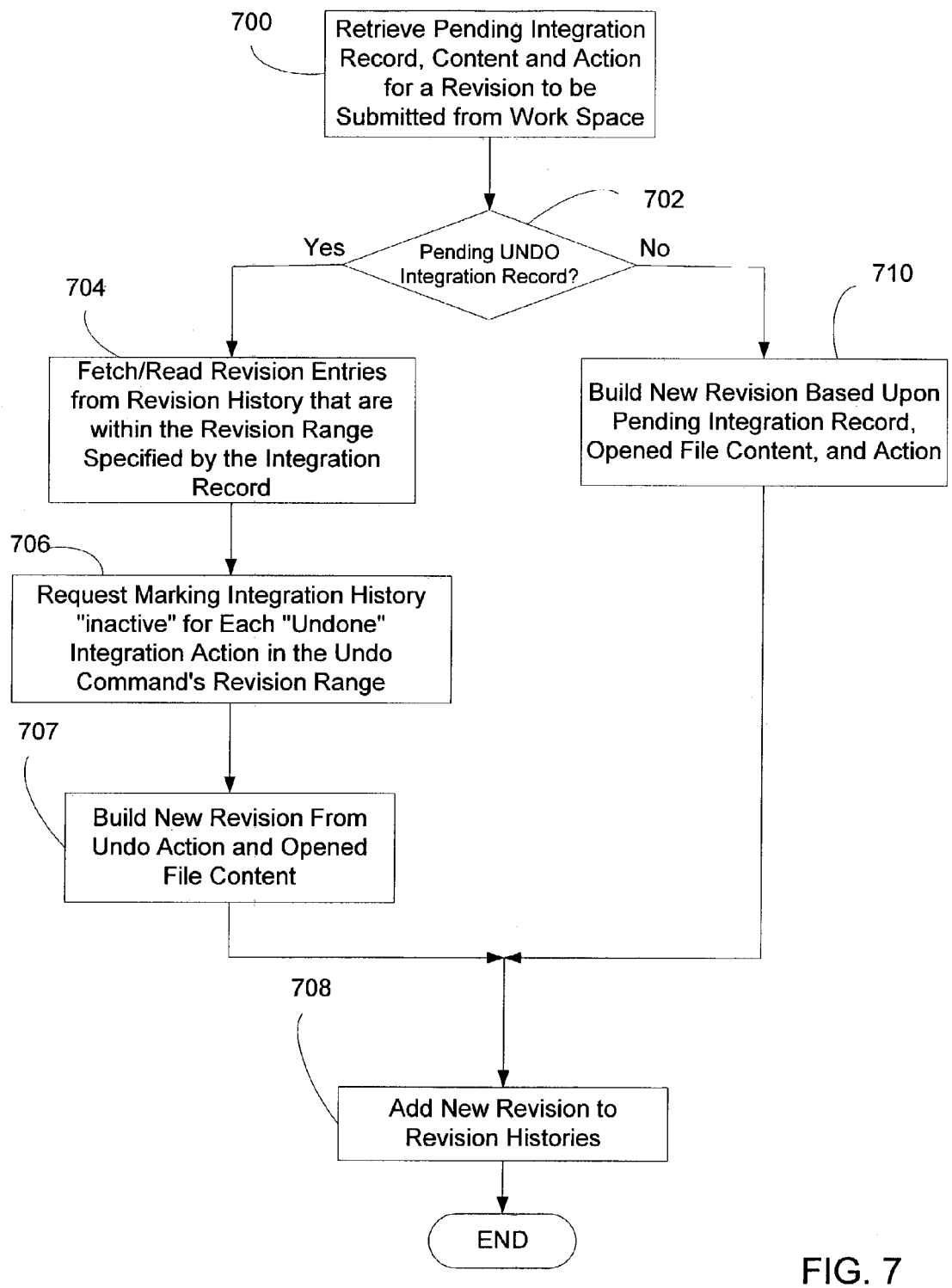
FIG. 7 is a flowchart summarizing a set of steps for carrying out a submit operation in accordance with an embodiment of the present invention.

Turning to FIG. 7, a set of steps are depicted for the submit operation 314. During the submit operation 314 the revision history 308 is updated to include a new revision to one or more files. In the example below, the set of steps are presented for submitting a single revision having a single associated pending integration record. However, it will be understood that the steps can be performed on a set of revisions and/or integration records in a similar way. Revisions are created individually and then submitted as a group to the revision histories 308.

During step 700 the submit operation 314 retrieves a pending integration record, action and content associated with a revision from the client work space 306 to submit in the form of a new revision to the revision histories 308. At step 702, the submit operation determines whether the pending integration record is an undo integration record or a regular integration record. If the pending integration record is an undo integration record, then control passes to step 704 wherein all the revision records that fall within the undo revision range are retrieved from the revision histories 308 (for purposes of determining whether any integration-based revisions exist). Thereafter, at step 706 for each revision record that includes an integration action (e.g., integrate, branch), the associated integration history is marked inactive. At step 707 a new revision record, specifying an undo action and content of the revision obtained from the work space, is built. Finally, at step 708 the new revision record—in this case one specifying an undo action—is added to the revision histories 308. Control then passes to the End.

Since the submit operation 314 also handles regular pending integration records, if at step 702 the submit operation 314 determines that a regular pending integration record has been retrieved, then control passes to step 710 wherein the submit operation 314 builds a new revision to add to the revision histories 308. The new revision includes an action (e.g., integrate), content, and integration history (from the pending integration record) obtained from the work space 306. Finally, at step 708 the new revision record is added to the revision histories 308 maintained by the server machine 310.

Turning to FIG. 8, a set of revisions are presented in a revision history (grouped by their file name rather than in chronological order). It is noted that the revisions in the table represent the submitted revisions. However, before a revision can be submitted, a user first opens the file on the local machine for the desired action. Furthermore, opening the file does not update the revision history and files can be reverted if needed. As described above, after a new revision set (including potentially revisions on multiple files) has been prepared on the local machine, the revisions are submitted into the revision histories 308 to actually form new revisions of the appropriate files. Submits of multiple revisions at the same time happen atomically, i.e. if the new revision of one file fails to get submitted then the whole set is rejected and has to be re-submitted after the problem is corrected.

The following is an exemplary set of steps corresponding to the table of actions depicted in FIG. 8. The example uses commands associated with the Source Depot SCM system. However, such steps, or variations thereof, can be performed in alternative SCM systems after enhancing their functionality to include support for the undo command and associated actions described herein.

0. Assuming that there no revision history initially
1. Create file foo.txt and put lines {"line1", "line3"} there.
2. 'sd add foo.txt': opens foo.txt for 'add' action
3. 'sd submit': submits a new revision foo.txt#1 with content {"line1", "line3"} and action 'add'. Row 1 is created in the table depicted in FIG. 8.
4. 'sd integrate foo.txt#1,1 bar.txt': Integrates changes introduced in revisions of foo.txt starting from #1 and ending with #1 (i.e. effectively only revisions in foo.txt#1) into bar.txt. Because there was no bar.txt entry in the revision table, the bar.txt is created on the local machine as a copy of foo.txt#1 and opened for 'branch'. A pending integration record is created that has information specifying that foo.txt#1,1 revisions are being integrated into bar.txt. No resolve is required, because this is a 'branch' action.
5. 'sd submit': submits a new revision, bar.txt#1, with content {"line1", "line3"} and action 'branch' and integration history {'foo.txt#1,1'}). Row 3 is created in FIG. 8.
6. 'sd edit foo.txt': opens foo.txt for 'edit'.
7. 'sd edit bar.txt': opens bar.txt for 'edit'.
8. Change content of foo.txt to contain lines {"line1", "line2", "line3"}; and change content of bar.txt to contain lines {"line1", "line3", "line4"}.
9. 'sd submit': submits the new revisions so that foo.txt#2 is created with content {"line1", "line2", "line3"} and action 'edit'; and bar.txt#2 is created with content {"line1", "line3", "line4"} and action 'edit'. Rows 2 and 4 are created in FIG. 8.
10. 'sd integrate foo.txt#1,2 bar.txt': integrates changes introduced in revisions of foo.txt starting from #1 and ending with #2 (i.e. effectively in foo.txt#1 and foo.txt #2)

into bar.txt. As there is integration history that stores the fact that foo.txt# 1,1 was already integrated into bar.txt, the effective revision range that actually is used is foo.txt#2,2. Bar.txt is opened for 'integrate' and a pending integration record is created that has information that foo.txt#2,2 is being integrated into bar.txt. The content of local bar.txt is not changed.

11. 'sd resolve bar.txt': merges the content changes. The pending integration record contains foo.txt#2,2 so the 'base' revision is foo.txt#1 and the 'source' revision is foo.txt#2 and the change that was made between them was <<add "line2" between "line 1" and "line3">>and it's merged into bar.txt, so the new content of bar.txt is {"line1", "line2", "line3", "line4"}.

12. 'sd submit': submits the new revision bar.txt#3 with content {"line 1", "line2", "line3", "line4"} and action 'integrate' and integration history {'foo.txt#2,2'}. Row 5 is created in FIG. 8.

13. 'sd edit bar.txt': opens bar.txt for 'edit'.

14. Change content of bar.txt to contain lines {"line0", "line1", "line2", "line3""line4"}.

15. 'sd submit': submits the new revisions so that bar.txt#4 is created with content {"line0", "line1", "line2", "line3", "line4"} and action 'edit'. Row 6 is created in FIG. 8.

Then an undo action is initiated, and the following events occur:

16. 'sd undo bar.txt#2,3': opens bar.txt for undoing changes introduced in revisions starting from #2 and ending with #3 (i.e. effectively in bar.txt#2 and bar.txt#3). As the actions of just-before-the-bottom and the top revisions of the input range and the action of the last revision of the file are 'edit' the resulting action is 'edit-undo', and resolve is required to merge content changes. The pending 'undo' integration record is bar.txt#2,3(undo).

17. 'sd resolve bar.txt': merges content changes. The file has a pending 'undo' integration record bar.txt#2,3(undo) so the 'base' revision is bar.txt#3 and the 'source' revision is bar.txt#1—as explained in association with the exemplary resolve operation described in FIG. 6, the range of revisions is turned upside-down. The change that was made between the two revisions was effectively <<delete "line2" between "line1" and "line3" and delete "line4" after "line3">>. This change is merged into bar.txt, so the new content of bar.txt is {"line0", "line1", "line3"}. This is exactly the content bar.txt would have contained if the revisions bar.txt#2 and bar.txt#3 hadn't been submitted.

18. 'sd submit bar.txt': submits the new revision bar.txt#5 with content {"line0", "line1", "line3"} and action 'edit-undo'. As the pending 'undo' integration record has bar.txt#2 and bar.txt#3 in the range, the integration history for bar.txt#3 (at Row 5 of FIG. 8) is made 'inactive'. Row 7 is created in FIG. 8.

It will be appreciated by those skilled in the art that a new and useful method and system for maintaining revisions and undoing previously entered revisions in an SCM system has been described herein. In view of the many possible computing environments to which the principles of this invention may be applied and the flexibility of designing and carrying out software development tools, including SCM systems that archive revisions to source code during its development, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for undoing changes embodied in prior revisions in a software configuration management (SCM) system comprising:

receiving a command to undo a set of revisions within a revision history for a file;

determining, in response to receiving the command, a revision action for undoing changes to the file arising from the set of revisions;

submitting a new revision, incorporating the revision action for undoing changes to the file arising from the set of revisions, to the revision history for the file; and retaining prior revisions wherein the undo actions are stored within new entries in the revision history.

2. The method of claim 1 wherein a type of the revision action is based upon types of revision actions specified by revisions previously submitted to the revision history for the file.

3. The method of claim 2 wherein the type of the revision action is based upon actions of revisions having particular positions within the revision history for the file.

4. The method of claim 3 wherein the type of the revision action is based upon actions of revisions having particular positions within the revision history in relation to a specified range of revisions to be undone.

5. The method of claim 4 wherein the type of the revision action is based upon actions specified for: a top revision of the specified range of revisions, a revision just before the bottom revision of the specified range of revisions, and a most recently added revision in the revision history for the file.

6. The method of claim 1 wherein determining the revision action comprises selecting a closest reasonable revision action when the set of revisions cannot be undone due to actions currently specified in the revision history for the specified file.

7. The method of claim 6 wherein the selecting a closest reasonable revision action is enabled by a flag specified in the command.

8. The method of claim 1 wherein the revision action for the new revision is identified as an action type for undoing previously submitted revisions for the file.

9. The method of claim 1 further comprising:

resolving a range of revisions to be undone, including identifying differences between the file after carrying out the last revision in the range of revisions, and the file just before the first revision in the range of revisions.

10. The method of claim 9 further comprising:

merging changes, identified during resolving the range of revisions, into a most recent revision of the file.

11. The method of claim 1, wherein the SCM system supports integration of a set of revisions from a source file into a revision target file, further comprising:

modifying a revision entry specifying an integration action, for a revision falling within the specified set of revisions, to indicate that the integration action no longer contributes changes affecting the content of a current version of the file.

12. A software configuration management (SCM) system including sub-components for facilitating undoing changes embodied in prior revisions in response to receiving a command to undo a set of revisions within a revision history for a file, the SCM system comprising:

a first module for determining, in response to receiving the command, a revision action for reversing changes to the file arising from the set of revisions;

a second module for submitting a new revision, incorporating the revision action for reversing changes to the file arising from the set of revisions, to the revision history for the file; and a third module fore retaining prior revisions wherein the undo actions are stored within new entries in the revision history.

13. The system of claim 12 further comprising a criterion, consulted by the first module, for selecting an action type for undoing the set of revisions.

14. The system of claim 13 wherein the criterion further specifies a closest reasonable revision action when the set of revisions cannot be undone due to actions currently specified in the revision history for the specified file.

15. The system of claim 14 wherein a flag specified in the command selectively allows selecting a closest reasonable revision action using the criterion.

16. The system of claim 13 wherein the criterion comprises a decision table.

17. The system of claim 13 wherein the criterion specifies an action type based upon types of revision actions specified by revisions previously submitted to the revision history for the file.

18. The system of claim 17 wherein the criterion specifies an action type based upon actions of revisions having particular positions within the revision history for the file.

19. The system of claim 18 wherein the criterion specifies an action type based upon actions of revisions having particular positions within the revision history in relation to a specified range of revisions to be undone.

20. The system of claim 19 wherein the criterion specifies an action type based upon actions specified for: a top revision of the specified range of revisions, a revision just before the bottom revision of the specified range of revisions, and a most recently added revision in the revision history for the file.

21. The system of claim 12 wherein the revision action for the new revision is identified as an action type for undoing previously submitted revisions for the file.

22. The system of claim 12 further comprising:

a third module for resolving a range of revisions to be undone, wherein the third module identifies differences between the file after carrying out the last revision in the range of revisions, and the file just before the first revision in the range of revisions.

23. The system of claim 22 wherein the third module merges changes, identified during resolving the range of revisions, into a most recent revision of the file.

24. The system of claim 22 wherein integration of a set of revisions from a source file into a revision target file is supported and wherein the second module modifies a revision entry specifying an integration action, for a revision falling within the specified set of revisions, to indicate that the integration action no longer contributes changes affecting the content of a current version of the file.

25. The system of claim 12 wherein the first and second modules are incorporated into an SCM client.

26. The system of claim 25 wherein the revision history is maintained within an SCM server.

27. At least one computer-readable medium including computer-executable instructions for facilitating undoing changed embodied in prior revisions in a software configuration management (SCM) system, the computer-executable instructions facilitating performing a method comprising:

receiving a command to undo a set of revisions within a revision history for a file;

determining, in response to receiving the command, a revision action for undoing changes to the file arising from the set of revisions; and submitting a new revision, incorporating the revision action for undoing changes to the file arising from the set of revisions, to the revision history for the file; and retaining prior revisions wherein the undo actions are stored within new entries in the revision history.

28. The computer-readable medium of claim 27 wherein a type of the revision action is based upon types of revision actions specified by revisions previously submitted to the revision history for the file.

29. The computer-readable medium of claim 28 wherein the type of the revision action is based upon actions of revisions having particular positions within the revision history for the file.

30. The computer-readable medium of claim 29 wherein the type of the revision action is based upon actions of revisions having particular positions within the revision history in relation to a specified range of revisions to be undone.

31. The computer-readable medium of claim 30 wherein the type of the revision action is based upon actions specified for: a top revision of the specified range of revisions, a revision just before the bottom revision of the specified range of revisions, and a most recently added revision in the revision history for the file.

32. The computer-readable medium of claim 27 wherein determining the revision action comprises selecting a closest reasonable revision action when the set of revisions cannot be undone due to actions currently specified in the revision history for the specified file.

33. The computer-readable medium of claim 32 wherein the selecting a closest reasonable revision action is enabled by a flag specified in the command.

34. The computer-readable medium of claim 27 wherein the revision action for the new revision is identified as an action type for undoing previously submitted revisions for the file.

35. The computer-readable medium of claim 27 further comprising computer-executable instructions facilitating performing:

resolving a range of revisions to be undone, including identifying differences between the file after carrying out the last revision in the range of revisions, and the file just before the first revision in the range of revisions.

36. The computer-readable medium of claim 35 further comprising computer-executable instructions facilitating performing: merging changes, identified during resolving the range of revisions, into a most recent revision of the file.

37. The computer-readable medium of claim 36, wherein the SCM system supports integration of a set of revisions from a source file into a revision target file, and further comprising computer-executable instructions facilitating performing:

modifying a revision entry specifying an integration action, for a revision falling within the specified set of revisions, to indicate that the integration action no longer contributes changes affecting the content of a current version of the file.

38. A software configuration management (SCM) system capable of undoing changes embodied in a range of prior revisions while preserving the range of prior revisions in the revision history, the SCM system comprising:

means for receiving a command to undo a set of revisions within a revision history for a file;

means for determining a revision action for undoing changes to the file arising from the set of revisions;

means for submitting a new revision, incorporating the revision action for undoing changes to the file arising from the set of revisions, to the revision history for the file; and means for retaining prior revisions wherein the undo actions are stored within new entries in the revision history.

39. The SCM system of claim 38 wherein the determining means comprises means for selecting a closest reasonable revision action when the set of revisions cannot be undone due to actions currently specified in the revision history for the specified file.

40. The SCM system of claim 38 further comprising:
means for resolving a range of revisions to be undone, the resolving means including means for identifying differences between the file after carrying out the last revision in the range of revisions, and the file just before the first revision in the range of revisions.

41. The SCM system of claim 40 further comprising:
means for merging changes, identified by the resolving means, into a most recent revision of the file.

42. The SCM system of claim 38, wherein the SCM system supports integration of a set of revisions from a source file into a revision target file, further comprising:
means for modifying a revision entry specifying an integration action, for a revision falling within the specified set of revisions, to indicate that the integration action no longer contributes changes affecting the content of a current version of the file.

43. A software configuration management (SCM) system including sub-components for facilitating undoing changes embodied in prior revisions in response to receiving a command to undo a set of revisions within a revision history for a file, the SCM system comprising:
a first means for determining, in response to receiving the command, a revision action for reversing changes to the file arising from the set of revisions;
a second means for submitting a new revision, incorporating the revision action for reversing changes to the file arising from the set of revisions, to the revision history for the file; and
a third means for retaining prior revisions wherein the undo actions are stored within new entries in the revision history.

44. The SCM system of claim 43 further comprising:
a third means for resolving a range of revisions to be undone, wherein the third means identifies differences between the file after carrying out the last revision in the range of revisions, and the file just before the first revision in the range of revisions.

45. A method for undoing changes embodied in prior revisions in a software configuration management (SCM) system comprising:
receiving a command to undo a set of revisions within a revision history for a file;
determining by a resolve module, in response to receiving the command, revision content for undoing changes to the file arising from the set of revisions;
submitting a new revision, incorporating the revision content for undoing changes to the file arising from the set of revisions, to the revision history for the file; and
retaining prior revisions wherein the undo actions are stored within new entries in the revision history.

46. The method of claim 45 further comprising:
determining a revision action for undoing changes to the file arising from the set of revisions.

47. The method of claim 46 wherein a type of the revision action is based upon types of revision actions specified by revisions previously submitted to the revision history for the file.

48. The method of claim 47 wherein the type of the revision action is based upon actions of revisions having particular positions within the revision history for the file.

49. The method of claim 48 wherein the type of the revision action is based upon actions of revisions having particular positions within the revision history in relation to a specified range of revisions to be undone.

50. The method of claim 49 wherein the type of the revision action is based upon actions specified for: a top revision of the specified range of
revisions, a revision just before the bottom revision of the specified range of revisions, and a most recently added revision in the revision history for the file.

51. The method of claim 46 wherein determining an action comprises selecting a closest reasonable revision action when the set of revisions cannot be undone due to actions currently specified in the revision history for the specified file.

52. The method of claim 45 wherein determining by a resolve module comprises identifying differences between the file after carrying out the last revision in the range of revisions, and the file just before the first revision in the range of revisions.

53. The method of claim 52 further comprising:
merging changes, identified during the determining by the resolve module, into a most recent revision of the file.

54. The method of claim 45, wherein the SCM system supports integration of a set of revisions from a source file into a revision target file, further comprising:
modifying a revision entry specifying an integration action, for a revision falling within the specified set of revisions, to indicate that the integration action no longer contributes changes affecting the content of a current version of the file.

55. A software configuration management (SCM) system including sub-components for facilitating undoing changes embodied in prior revisions in response to receiving a command to undo a set of revisions within a revision history for a file, the SCM system comprising:
a resolve module for determining, in response to receiving the command, revision content for reversing changes to the file arising from the set of revisions;
a submit module for submitting a new revision, incorporating the revision content for reversing changes to the file arising from the set of revisions, to the revision history for the file; and
a retaining module for retaining prior revisions wherein the undo actions are stored within new entries in the revision history.

56. The system of claim 55 further comprising an undo module for determining, in response to receiving the command, a revision action for reversing changes to the file arising from the set of revisions.

57. The system of claim 56 further comprising a criterion, consulted by the undo module, for selecting an action type for undoing the set of revisions.

58. The system of claim 57 wherein the criterion comprises a decision table.

59. The system of claim 57 wherein the criterion specifies an action type based upon types of revision actions specified by revisions previously submitted to the revision history for the file.

60. The system of claim 59 wherein the criterion specifies an action type based upon actions of revisions having particular positions within the revision history for the file.

61. The system of claim 60 wherein the criterion specifies an action type based upon actions of revisions having particular positions within the revision history in relation to a specified range of revisions to be undone.

62. The system of claim 61 wherein the criterion specifies an action type based upon actions specified for: a top revision of the specified range of revisions, a revision lust before the bottom revision of the specified range of revisions, and a most recently added revision in the revision history for the file.

63. The system of claim 57 wherein the criterion further specifies a closest reasonable revision action when the set of revisions cannot be undone due to actions currently specified in the revision history for the specified file.

64. The system of claim 63 wherein a flag specified in the command selectively allows selecting a closest reasonable revision action using the criterion.

65. The system of claim 56 wherein the revision action for the new revision is identified as an action type for undoing previously submitted revisions for the file.

66. The system of claim 55 wherein the resolve module identifies differences between the file after carrying out the last revision in the range of revisions, and the file just before the first revision in the range of revisions.

67. The system of claim 66 wherein the resolve module merges changes, identified during resolving the range of revisions, into a most recent revision of the file.

68. The system of claim 66 wherein integration of a set of revisions from a source file into a revision target file is supported and wherein the submit module modifies a revision entry specifying an integration action, for a revision falling within the specified set of revisions, to indicate that the integration action no longer contributes changes affecting the content of a current version of the file.

69. The system of claim 55 wherein the resolve and submit modules are incorporated into an SCM client.

70. The system of claim 69 wherein the revision history is maintained within an SCM server.

71. At least one computer-readable medium including computer-executable instructions for facilitating undoing changes embodied in prior revisions in a software configuration management (SCM) system, the computer-executable instructions facilitating performing a method comprising:
  receiving a command to undo a set of revisions within a revision history for a file;
  determining by a resolve module, in response to receiving the command, revision content for undoing changes to the file arising from the set of revisions;
  submitting a new revision, incorporating the revision content for undoing changes to the file arising from the set of revisions, to the revision history for the file; and
  retaining prior revisions wherein the undo actions are stored within new entries in the revision history.

72. The computer-readable medium of claim 71 wherein the method further comprises:
  determining a revision action for undoing changes to the file arising from the set of revisions.

73. The computer-readable medium of claim 72 wherein a type of the revision action is based upon types of revision actions specified by revisions previously submitted to the revision history for the file.

74. The computer-readable medium of claim 73 wherein the type of the revision action is based upon actions of revisions having particular positions within the revision history for the file.

75. The computer-readable medium of claim 74 wherein the type of the revision action Is based upon actions of revisions having particular positions within the revision history In relation to a specified range of revisions to be undone.

76. The computer-readable medium of claim 75 wherein the type of the revision action is based upon actions specified for: a top revision of the specified range of revisions, a revision just before the bottom revision of the specified range of revisions, and a most recently added revision in the revision history for the file.

77. The computer-readable medium of claim 72 wherein determining a revision action comprises selecting a closest reasonable revision action when the set of revisions cannot be undone due to actions currently specified In the revision history for the specified file.

78. The computer-readable medium of claim 71 wherein determining by a resolve module comprises identifying differences between the file after carrying out the last revision In the range of revisions, and the file just before the first revision in the range of revisions.

79. The computer-readable medium of claim 78 wherein the method further comprises:
  merging changes, identified during the determining by the resolve module, into a most recent revision of the file.

80. The computer-readable medium of claim 71, wherein the SCM system supports integration of a set of revisions from a source file into a revision target file, further comprising:
  modifying a revision entry specifying an integration action, for a revision falling within the specified set of revisions, to indicate that the integration action no longer contributes changes affecting the content of a current version of the file.

81. A software configuration management (SCM) system capable of undoing changes embodied in a range of prior revisions while preserving the range of prior revisions in the revision history, the SCM system comprising:
  means for receiving a command to undo a set of revisions within a revision history for a file;
  a resolve module for determining revision content for undoing changes to the file arising from the set of revisions; and
  means for submitting a new revision, incorporating the revision content for undoing changes to the file arising from the set of revisions, to the revision history for the file; and
  means for retaining prior revisions wherein the undo actions are stored within new entries in the revision history.

82. The SCM system of claim 81 further comprising:
  means for determining a revision action for undoing changes to the file arising from the set of revisions.

83. The SCM system of claim 82 wherein the means for determining a revision action comprises means for selecting a closest reasonable revision action when the set of revisions cannot be undone due to actions currently specified in the revision history for the specified file.

84. The SCM system of claim 81, wherein the SCM system supports integration of a set of revisions from a source file into a revision target file, further comprising:

means for modifying a revision entry specifying an integration action, for a revision falling within the specified set of revisions, to indicate that the integration action no longer contributes changes affecting the content of a current version of the file.

85. A software configuration management (SCM) system including sub-components for facilitating undoing changes embodied in prior revisions in response to receiving a command to undo a set of revisions within a revision history for a file, the SCM system comprising:

means for determining, in response to receiving the command, revision content for reversing changes to the file arising from the set of revisions;

means for submitting a new revision, incorporating the revision content for reversing changes to the file arising from the set of revisions, to the revision history for the file; and means for retaining prior revisions wherein the undo actions are stored within new entries in the revision history.

\* \* \* \* \*